(12) United States Patent
Maekawa

(10) Patent No.: US 11,320,410 B2
(45) Date of Patent: May 3, 2022

(54) CHROMATOGRAPHIC MASS ANALYSIS DEVICE AND CONTROL METHOD

(71) Applicant: Hitachi High-Technologies Corporation, Tokyo (JP)

(72) Inventor: Akira Maekawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 713 days.

(21) Appl. No.: 16/304,945

(22) PCT Filed: Jun. 16, 2016

(86) PCT No.: PCT/JP2016/067990
§ 371 (c)(1),
(2) Date: Nov. 27, 2018

(87) PCT Pub. No.: WO2017/216934
PCT Pub. Date: Dec. 21, 2017

(65) Prior Publication Data
US 2021/0223218 A1   Jul. 22, 2021

(51) Int. Cl.
*G01N 30/72* (2006.01)
*G01N 27/62* (2021.01)
(Continued)

(52) U.S. Cl.
CPC ....... *G01N 30/8651* (2013.01); *G01N 30/466* (2013.01); *G01N 30/7233* (2013.01)

(58) Field of Classification Search
None
See application file for complete search history.

(56) References Cited

U.S. PATENT DOCUMENTS

2002/0074490 A1   6/2002   Umemura
2002/0084222 A1   7/2002   Brann
(Continued)

FOREIGN PATENT DOCUMENTS

JP   2002-181784 A   6/2002
JP   2004-524518 A   8/2004
(Continued)

OTHER PUBLICATIONS

International Search Report (PCT/ISA/210) issued in PCT Application No. PCT/JP2016/067990 dated Sep. 13, 2016 with English translation (five (5) pages).
(Continued)

*Primary Examiner* — Daniel S Larkin
(74) *Attorney, Agent, or Firm* — Crowell & Moring LLP

(57) ABSTRACT

In the present invention, an analysis schedule is pre-created such that streams of a plurality of liquid chromatograms can operate in parallel and a mass spectrometer can collect data at the timing of each component elution. A control unit controls so as to: divide the time required to analyze each sample in a plurality of liquid chromatogram systems into pre-collection time, time during collection, and post-collection time; search and allocate time positions in which the time during collection in the liquid chromatogram units do not overlap; determine start times for the plurality of liquid chromatogram units to thereby create an analysis schedule; and thereafter perform analysis. The control unit further stores parameter sets for varying component elution times, adjusts analysis parameters so as to make data collection timings appropriate for creating an analysis schedule, and changes the component elution times.

13 Claims, 9 Drawing Sheets

(51) Int. Cl.
*G01N 30/02* (2006.01)
*G01N 30/24* (2006.01)
*G01N 30/86* (2006.01)
*G01N 30/46* (2006.01)

(56) References Cited

U.S. PATENT DOCUMENTS

2013/0014566 A1  1/2013  Marks
2014/0047906 A1  2/2014  Herman et al.

FOREIGN PATENT DOCUMENTS

JP    2013-541022 A       11/2013
WO    WO 02/053255    *   7/2002
WO    WO 2014/068786 A1   5/2014

OTHER PUBLICATIONS

Japanese-language Written Opinion (PCT/ISA/237) issued in PCT Application No. PCT/JP2016/067990 dated Sep. 13, 2016 (four (4) pages).

* cited by examiner

FIG. 3

| | 301 | 302 | 303 | 304 | 305 |
|---|---|---|---|---|---|
| | SAMPLE NAME | VIAL No. | STREAM | ANALYSIS CONDITION | |
| | Sample1 | 11 | HPLC1 | CONDITION SETTING A | |
| | Sample2 | 12 | HPLC2 | CONDITION SETTING B | |
| | Sample3 | 13 | HPLC3 | CONDITION SETTING C | |

| TIME (SECOND) | SIGNAL WIDTH (SECOND) |
|---|---|
| 61 | 12 |
| 130 | 12 |

| COLUMN TYPE | FLOW RATE | RATIO OF RETENTION TIME AGAINST STANDARD FLOW RATE |
|---|---|---|
| COLUMN A | 0.6<br>0.7<br>0.8 (STANDARD)<br>0.9<br>1.0 | 1.333<br>1.143<br>1.000<br>0.889<br>0.800 |
| COLUMN B | 0.8<br>0.9<br>1.0 (STANDARD)<br>1.1<br>1.2 | 1.350<br>1.200<br>1.000<br>0.950<br>0.850 |

CHROMATOGRAPHIC MASS ANALYSIS DEVICE AND CONTROL METHOD

TECHNICAL FIELD

The present invention relates to a chromatographic mass analysis device and a control method thereof.

BACKGROUND ART

In recent years, a quantitative analysis method using a liquid chromatographic mass spectrometer has been widely used in medical components and metabolites in biological samples, residues in environmental samples, and the like. A mass spectrometer is used in a high-sensitivity detector of liquid chromatograph. The mass spectrometer includes, for example, a quadrupole mass spectrometer, an ion trap mass spectrometer, and a time-of-flight mass spectrometer, which may be used differently according to the purpose of measurement. For the purpose of quantitative analysis, the quadrupole mass spectrometer is mainly used.

The quadrupole mass spectrometer may measure a mass number using two methods of scanning measurement and selected ion monitoring (SIM). In scanning measurement, scanning is performed within a predetermined mass number range and the spectrum of ions included in the set mass number range is detected. This scanning method is used in qualitative analysis of unknown samples and the like. In SIM measurement, a chromatogram of ions having a specific mass number specified in advance is selectively detected. This method is used when a component to be analyzed is known and quantitative analysis of the component is performed with high sensitivity.

In particular, in confirmation of medical components or metabolites in biological samples, residues in environmental samples, and the like, generally, SIM measurement of a known mass number is performed, a peak in an arbitrary retention time of an obtained chromatogram is detected, and an area value thereof is calculated as a quantitative value. When a component to be detected is known, if analysis conditions are the same, the retention time is known. Therefore, the mass spectrometer may perform ionization and detection of several seconds to several tens of seconds in the vicinity of the retention time.

On the other hand, the liquid chromatogram needs to be subjected to a column equilibration process, an injecting process of components into columns, a gradient and component elution process, a washing process after elution and a process of several minutes to several hours. Therefore, if liquid chromatogram and mass spectrometer are in one-to-one correspondence, the mass spectrometer is in a non-operation state for most of the time.

In routine analysis such as environmental analysis and medical analysis, low-cost and high-throughput analysis devices are required. To improve an operation rate of a mass spectrometer being in non-operation states lots of times and to analyze a sample with high throughput as described above, analysis devices for selecting one among a plurality of analysis systems (hereinafter, referred to as streams) of liquid chromatogram by a valve and introducing them into the mass spectrometer attracted attention in recent years.

This analysis device has a plurality of liquid feeding pumps and columns and each of the streams independently operate. Since a set of analysis operations is performed in parallel, the operation rate of the mass spectrometer is improved and the total analysis time is shortened.

An example of such a system includes PTL 1. In PTL 1, sets including a pump, an autosampler and a column, which are the components of the liquid chromatogram, are provided as a plurality of streams and are switched by valves, thereby maximizing data collection ability of the mass spectrometer.

CITATION LIST

Patent Literature

PTL 1: JP-A-2004-524518

SUMMARY OF INVENTION

Technical Problem

In a liquid chromatographic mass spectrometer including a plurality of streams, it is important to appropriately set the operation start timing of each stream and the data collection timing of the mass spectrometer. A liquid chromatogram requires at least a column equilibration process, an injecting process of components into columns, a gradient and component elution process and a washing process after elution. A period when data collection is performed in the mass spectrometer is a small portion of the component elution process among the above-described processes.

Therefore, a device control unit such as a control computer must instruct data collection start of the mass spectrometer at an appropriate timing while performing each process of the liquid chromatogram. Further, data non-collection time periods of each stream needs to be scheduled to overlap that of other streams, thereby improving sample processing efficiency.

That is, there is a need for a schedule generation procedure of defining the periods of the processes of analysis operation, such as a column equilibration process, an injecting process of components into columns, a gradient and component elution process and a washing process after elution of the liquid chromatogram and performing the processes as parallel as possible.

At the same time, it is necessary to determine the period when data is collected by the mass spectrometer and the period when data collection is not required and to control the device control unit such that the mass spectrometer performs analysis operation by the determined analysis schedule. In a system including a single mass spectrometer, the schedule must be determined such that the periods when data is collected do not overlap between the plurality of streams.

An object of the present invention is to solve the above problems and to provide a chromatographic mass analysis device for carrying out the processes of each stream of a plurality of liquid chromatograms in parallel and determining an analysis schedule in which a liquid chromatographic mass spectrometer performs data collection at appropriate timing, and a control method thereof.

Solution to Problem

To achieve the object, in the present invention, there are provided a chromatographic mass analysis device including a plurality of chromatogram units, a switching unit for selecting one of samples eluted from the plurality of chromatogram units, a mass analysis unit for ionizing and analyzing the sample introduced from the switching unit, and a control unit for controlling the chromatogram units, the switching unit and the mass analysis unit, in which the control unit divides time required for sample analysis into a pre-collection time, a time during collection and a post-collection time, assigns the time during collection by searching for a time position where the times during collection of the plurality of chromatogram units do not overlap, and predetermines an analysis start time of each of the plurality of chromatogram units, and a control method thereof.

Advantageous Effects of Invention

According to the present invention, it is possible to determine an appropriate analysis schedule of a chromatographic mass analysis device.

BRIEF DESCRIPTION OF DRAWINGS

FIG. 3 is a view illustrating an example of a sample table of a chromatographic mass analysis device according to each embodiment.

DESCRIPTION OF EMBODIMENTS

Figure 1:
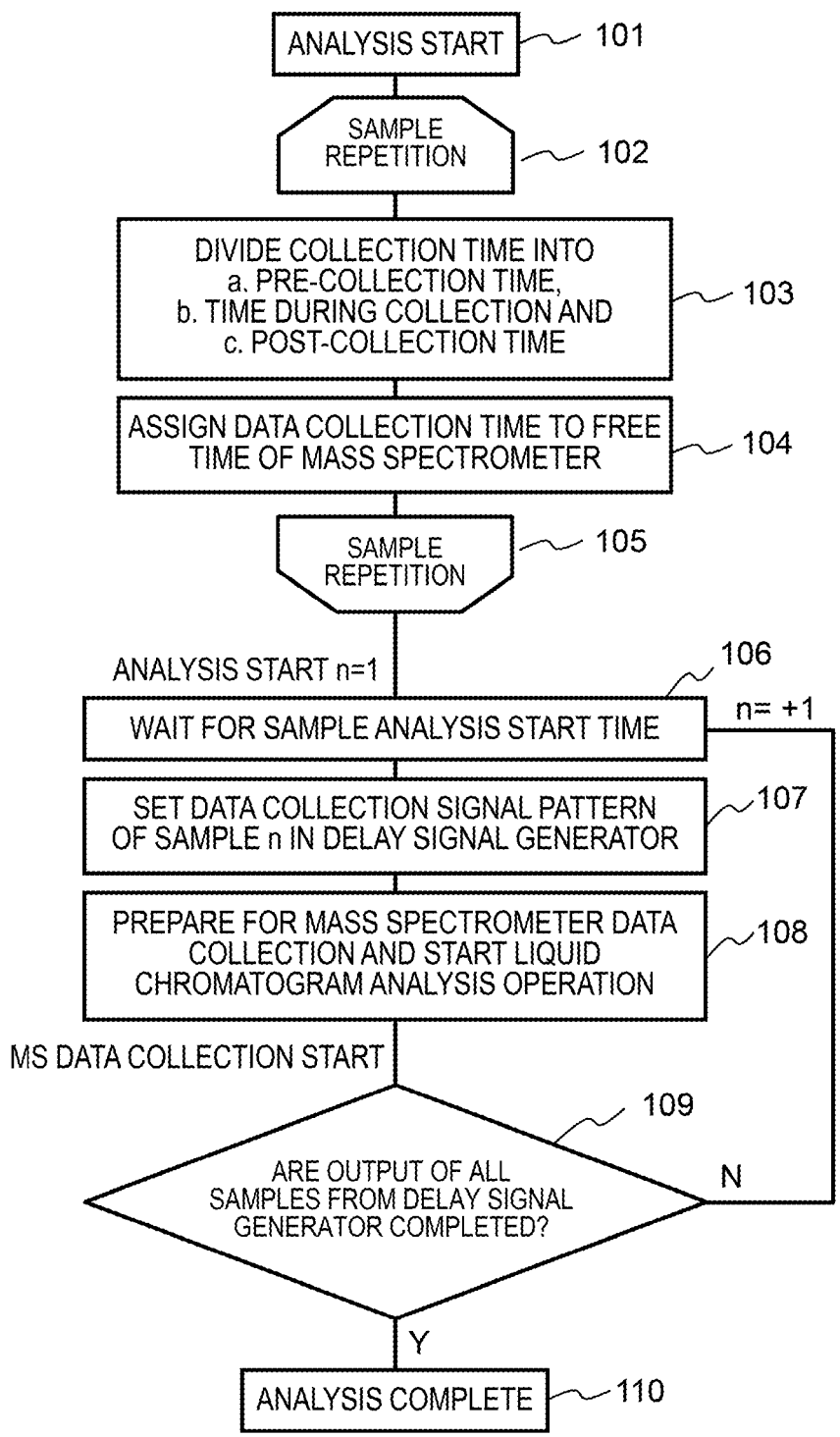
FIG. 1 is a flowchart illustrating an example of an analysis schedule determination procedure of a chromatographic mass analysis device according to Embodiment 1.

Hereinafter, the embodiments of the present invention will be described based on the drawings. The embodiments of the present invention are not limited to the following embodiments and various modifications are possible within the range of the technical idea. The present invention is characterized in that analysis operation of one sample in a chromatographic mass analysis device is divided into three types of times, that is, a pre-collection time and a time during collection and a post-collection time, and the pre-collection time and post-collection time of a stream operate in parallel with the time during collection of other streams, thereby more efficiently operating a mass analysis unit. In this specification, the three types of times are defined as follows.

The a. pre-collection time is from a time when the chromatogram mass analysis device starts analysis operation to a time when the mass analysis unit starts data collection and from a time when the mass analysis unit completes data collection to a time when next data collection starts. This time may include a washing process, an equilibration process, a sample injection process and a component elution process.

The b. time during collection is a component elution step of the chromatogram mass analysis device and is from a time when the mass analysis unit starts data collection of the stream to a time when data collection is completed. In particular, in data collection of the selected ion monitoring method, the b. time during collection is a time to detect a peak that appears at a time when the component is eluted (retention time). This is, for example, a time that added margin times before and after the peak such that rise or fall of the peak may be recognized. The time during collection of data exists for each component when a plurality of components is detected from one sample.

The c. post-collection time is, in analysis of the sample, from a time when the mass analysis unit completes last data collection to a time when the analysis operation of the chromatogram mass analysis device is completed. This time may include a washing process, an equilibration process and a next analysis preparation process.

The control unit of the chromatogram mass analysis device of the present invention retains a parameter set for changing a component elution time in a storage unit and adjusts an analysis parameter to become data collection timing appropriate for creation of an analysis schedule. The parameter set for changing a component elution time is information retaining a relationship of how a component elution time in a chromatogram changes when some of the analysis conditions are changed. When the time during collection of a certain stream overlaps the time during collection of other streams, the analysis condition to be changed is inversely calculated from the parameter set to avoid overlapping, and the analysis schedule is re-created. Therefore, it is possible to increase an operation rate of the mass spectrometer and to further improve throughput.

Embodiment 1

Embodiment 1 is an embodiment of a chromatographic mass analysis device including a plurality of chromatogram units, a switching unit for selecting one of samples eluted from the plurality of chromatogram units, a mass analysis unit for ionizing and analyzing the sample introduced from the switching unit, and a control unit for controlling the chromatogram units, the switching unit and the mass analysis unit, in which the control unit divides time required for sample analysis into a pre-collection time, a time during collection and a post-collection time, assigns the time during collection by searching for a time position where the times during collection of the plurality of chromatogram units do not overlap, and predetermines an analysis start time of each of the plurality of chromatogram units, and a control method thereof.

Figure 2:
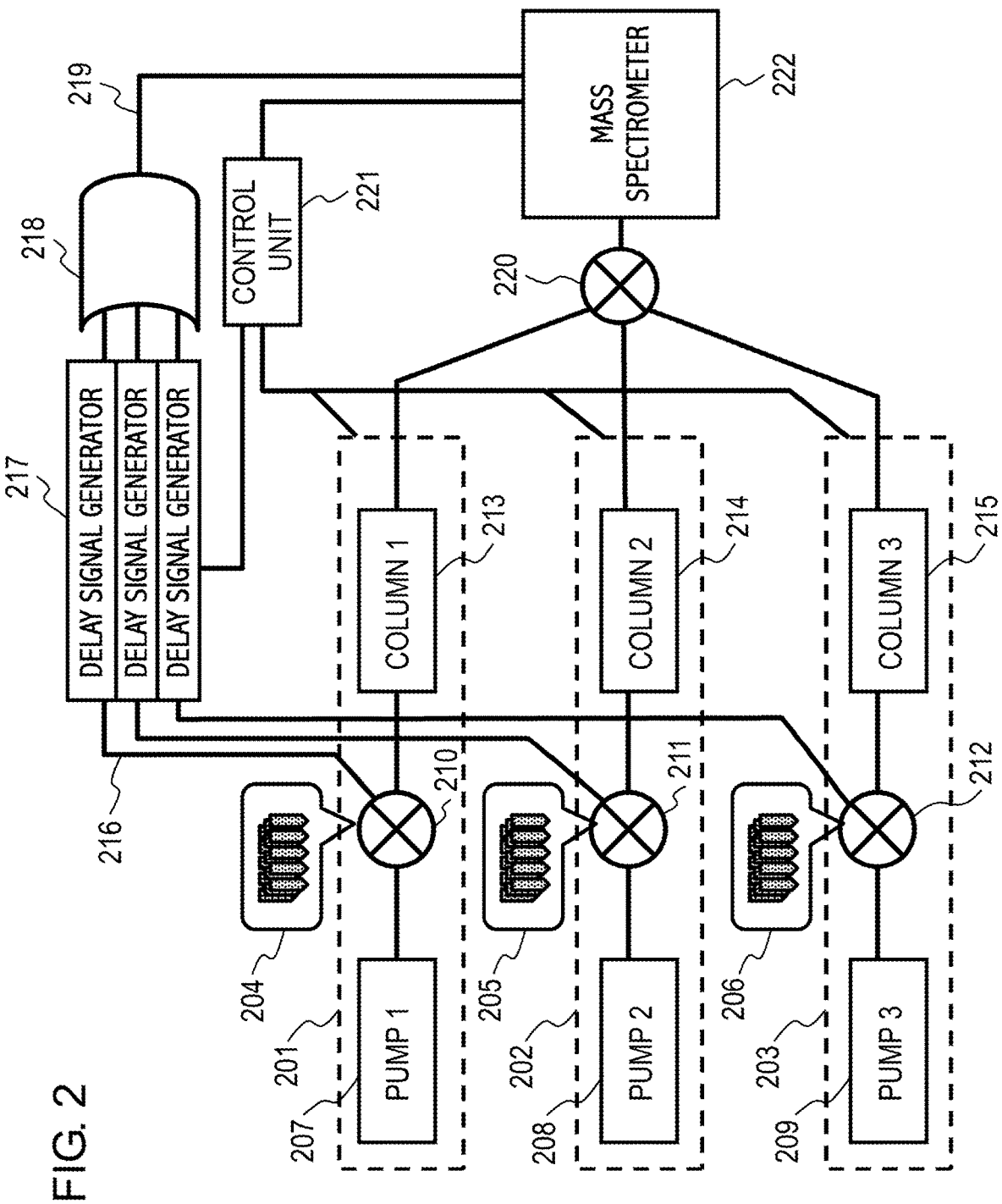
FIG. 2 is a view illustrating an example of a configuration of a chromatographic mass analysis device according to each embodiment.

FIG. 2 is a view illustrating an example of a configuration of a chromatographic mass analysis device according to Embodiment 1. Liquid chromatogram systems 201 to 203 included in a chromatogram unit include pumps 207 to 209 as pumps 1, 2 and 3, autosamplers 210 to 212, and columns 213 to 215 as columns 1, 2 and 3, respectively. These are controlled by a control unit 221 and are operable independently. A valve 220 is a switching unit which is controlled by the control unit 221 to switch flow channels from the liquid chromatogram systems 201 to 203. A mass spectrometer 222 which is a detector, that is, a mass analysis unit, ionizes and detects eluted components of the liquid chromatogram systems 201 to 203 selected by the valve 220 which is the switching unit.

Normally, the liquid chromatogram device has an autosampler start signal 216 for knowing sample injection timing. Generally, each of the autosamplers 210 to 212 inject samples from sample groups A, B and C respectively denoted as 204, 205 and 206 in the sample loop and then output the autosampler start signals 216 when a loop is connected to the flow channel.

The autosampler start signal 216 is used as an analysis start signal 219 of the mass spectrometer 222 which is the detector in a standard liquid chromatographic mass analysis device. However, in the device of the present embodiment, since only data of a desired portion during separation of the components is collected, delay signal generators 217 capable of setting a delay amount and the number of times by a command from the control unit 221 are further included, and, after the autosampler start signal 216 is input, the mass spectrometer 222 may perform data collection in an arbitrary time by an arbitrary number of times. That is, the delay signal generators 217 are provided to generate the start signal of the mass analysis unit based on a sample injection signal output from each chromatogram unit according to the time during collection predetermined by the control unit 221.

As illustrated in the sample table of FIG. 3, since the components to analyze differ by the streams of the liquid chromatogram systems 201 to 203, the elution times of the components differ too. Therefore, each of the delay signal generators 217 need to independently prepare for each of the streams of the liquid chromatogram systems 201 to 203. The output of each delay signal generator 217 is integrated in a logic OR circuit 218, and then used as the analysis start signal 219 of the mass spectrometer 222 which is the detector.

A hardware configuration including the delay signal generators 217 and logic OR circuit 218 for receiving the autosampler start signals 216 from the liquid chromatogram systems 201 to 203 and generating an analysis start signal may be realized by software of a computer included in the control unit 221 which will be described below.

The control unit 221 of the chromatographic mass analysis device is preferably assumed as a personal computer (PC) or a built-in type computer including a storage unit, and manages analysis condition setting and operation instruction to the liquid chromatogram systems 201 to 203, switching instruction to the valve 220, delay pattern instruction to the delay signal generators 217 and analysis condition setting and operation instruction to the mass spectrometer 222 according to the content of the sample table of FIG. 3. The sample table of FIG. 3 is stored in the storage unit of the PC or the like. When the functions of the delay signal generators 217 and the logic OR circuit 218 are realized in the control unit 221, the autosampler start signals 216 are input to the control unit 221 and the analysis start signal 219 created by program execution is output to the mass spectrometer 222. That is, the control unit generates the start signal of the mass analysis unit based on the sample injection signal output from each chromatogram unit according to the determined time during collection.

Figure 11:
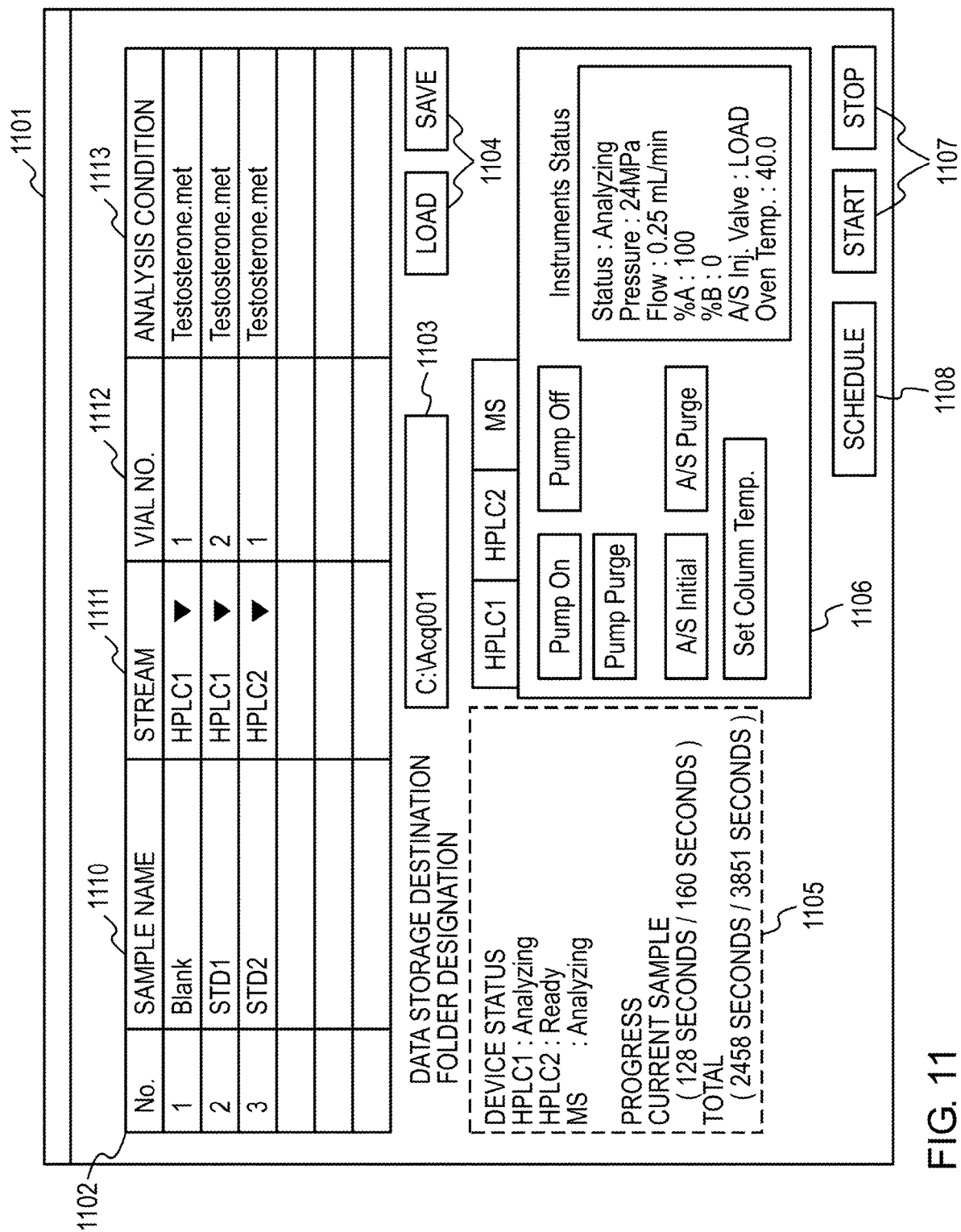
FIG. 11 is a view illustrating an example of an operation screen for controlling the entire chromatographic mass analysis device according to each embodiment.

FIG. 11 illustrates an example of an operation screen when the control unit 221 is a PC including a display unit such as a graphical user interface (GUI). An order table 1102 displayed on the operation screen 1101 includes a sample name 1110 to be analyzed, selection of a stream 1111 for analysis, designation of a vial No. 1112 in the liquid chromatogram autosampler of the selected stream, and selection of an analysis condition 1113. The order table corresponds to the sample name 301, the vial No. 302, the stream 303 and the analysis condition 304 of the sample table 305 illustrated in FIG. 3. The sample name 1110 may be given an arbitrary name and, when analysis is completed, the measurement results of the mass spectrometer are stored in the storage unit of the PC as a data file given this sample name.

The stream 1111 designates which stream is used for analysis. In this case, the vial No. 1112 set in the liquid chromatogram autosampler of the selected stream is input and is associated with the sample to be analyzed.

The analysis condition 1113 designates a file containing the analysis condition of the liquid chromatogram when analysis is performed and the analysis condition of the mass spectrometer.

Data storage destination folder designation 1103 designates a folder for storing the measurement results of the mass spectrometer. The content of the order table 1102 and the data storage destination folder designation 1103 may be stored or called using the load and save button 1104 with an arbitrary name.

A device status 1105 displays the operation status of the device (Analyzing, Busy, Ready, and the like), and displays an elapsed time and remaining time of analysis of a sample which is currently being analyzed, and an elapsed time and remaining time in the total analysis time as progress of analysis while analysis is being executed. In FIG. 11, it is illustrated that one of two liquid chromatograms HPLC1 and HPLC2 is analyzing and the other thereof is ready.

A manual operation unit 1106 is an operation portion for performing preparation before analysis or maintenance in individual portions such as a pump, an autosampler, a column oven of a liquid chromatogram unit or an ionization unit, an analysis unit and a detector of a mass spectrometer. By each operation in the manual operation unit 1106, operations such as purging or replacement of a solvent, equilibration of a column, or stabilization of various temperature or voltage control portions are performed before sample analysis, for analysis to be capable of starting.

Start/stop buttons 1107 are used to start and stop analysis. A schedule button 1108 is used to instruct creation of a schedule for predetermining the analysis start time of each of the plurality of chromatogram units corresponding to the sample in the order table 1102. The start/stop buttons 1107 are configured to be not operable unless the control unit 221 executes a program to determine the analysis schedule by operation of the schedule button 1108.

The schedule button 1108 is used to predetermine the analysis schedule based on the sample analysis information designated in the order table 1102. Hereinafter, an analysis schedule determination procedure of the chromatographic mass analysis device after operation of the schedule button 1108 and an analysis procedure thereafter will be described.

FIG. 1 is a flowchart illustrating an analysis schedule determination procedure and an analysis procedure in a simplest case of the chromatographic mass analysis device according to Embodiment 1. Hereinafter, the procedure of analysis start 101 and its sequels will be described in a step-by-step manner.

Sample repetition 102 is a repeating step of sequentially processing the samples indicated by the order table 1102.

In step 103, the data collection time is divided into the a. pre-collection time, the b. time during collection and the c. post-collection time.

Figures 4, 5:
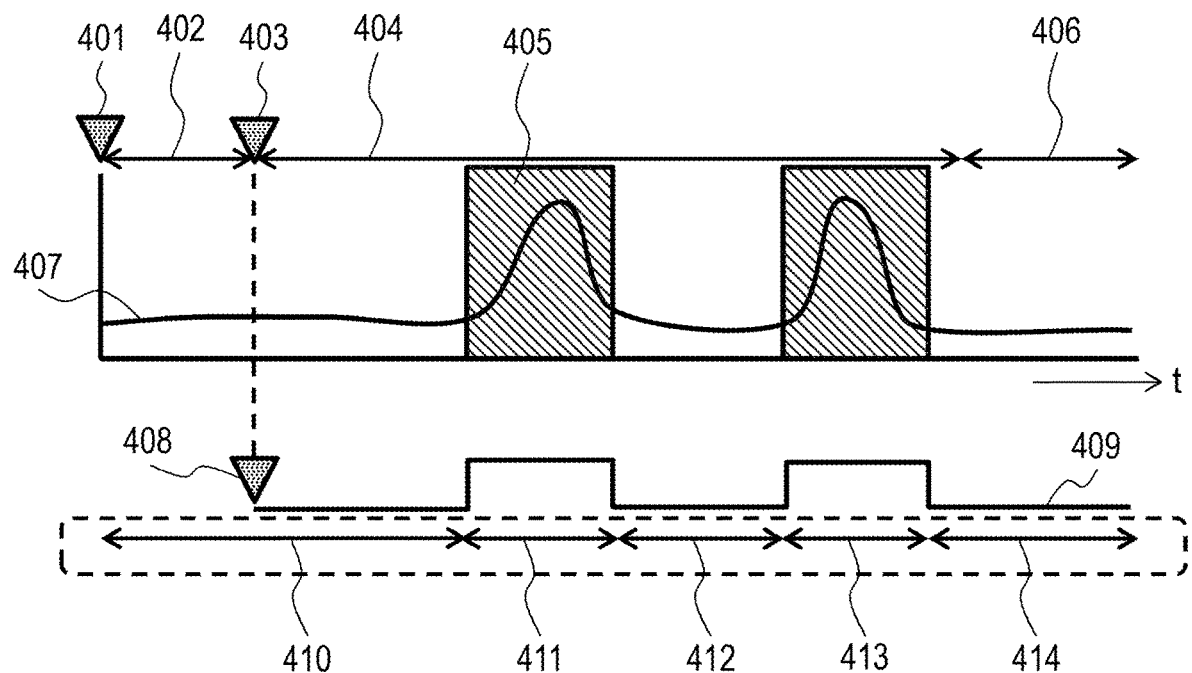
FIG. 4 is a view illustrating an example of an analysis time in a liquid chromatogram device according to Embodiment 1.
FIG. 5 is a table illustrating an analysis time in a liquid chromatogram device according to Embodiment 1.

FIG. 4 is a view illustrating an example of an analysis time of a liquid chromatogram device of the present embodiment. A liquid chromatogram signal 407 illustrates a temporary graph when the mass spectrometer 222 which is the detector is connected and a component is observed regularly.

In general, the liquid chromatogram device operates the pump regularly before analysis and performs equilibration of the column. In liquid chromatogram analysis start 401, equilibration 402 starts and waits for a regular time. Thereafter, in component injection 403, samples are sucked by the autosamplers 210 to 212 and are injected to the flow channel through the sample loop. As described above, at this moment, an autosampler injection signal 408 is output.

The autosampler injection signal 408 is input to the delay signal generator 217 illustrated in FIG. 2 to start delay signal generator output 409. Thereafter, the pumps 207 to 209 perform separation 404 while performing isocratic analysis by feeding liquid at a constant flow rate or gradient elution for continuously changing composition. In component elution 405, a peak of an area proportional to the concentration of the component in the sample is observed in a known elution time range. Here, in the delay signal generator 217, since the delay signal generator output 409 is output according to the data collection time which is the b.time during collection determined previously, the mass spectrometer 222 performs data collection at necessary timing. In washing 406, unnecessary residual components are discharged and the solvent in the column is replaced as necessary.

When the above processes are classified into the times a to c of the present invention, a time from liquid chromatogram analysis start 401 to a first data collection start time of the component elution 405 in equilibration 402 and separation 404 is defined as the a. pre-collection time 410. A time including a peak top during component elution 405, a peak start point, and a peak end point is defined as a data collection time 411 which is the b. data collection time.

When elution of a plurality of components is expected in one sample analysis, a time between a data collection time 411 which is the b. time during collection and a next data collection time 413 which is the b. time during collection is also defined as the a. pre-collection time, and the pre-collection time 412 and the data collection time 413 are alternately repeated according to the number of component elutions. A time from a time when last data collection 413 is completed to a time when liquid chromatogram analysis is completed is defined as the c. post-collection time 414. The above classification is performed in step 103 of division of FIG. 1.

In next step 104 of FIG. 1, a data collection time is assigned to free time of the mass spectrometer. In the assignment step, analysis of the sample is assigned at a time when liquid chromatogram analysis execution is capable of starting and the mass spectrometer 222 is capable of data collection.

Figure 6:
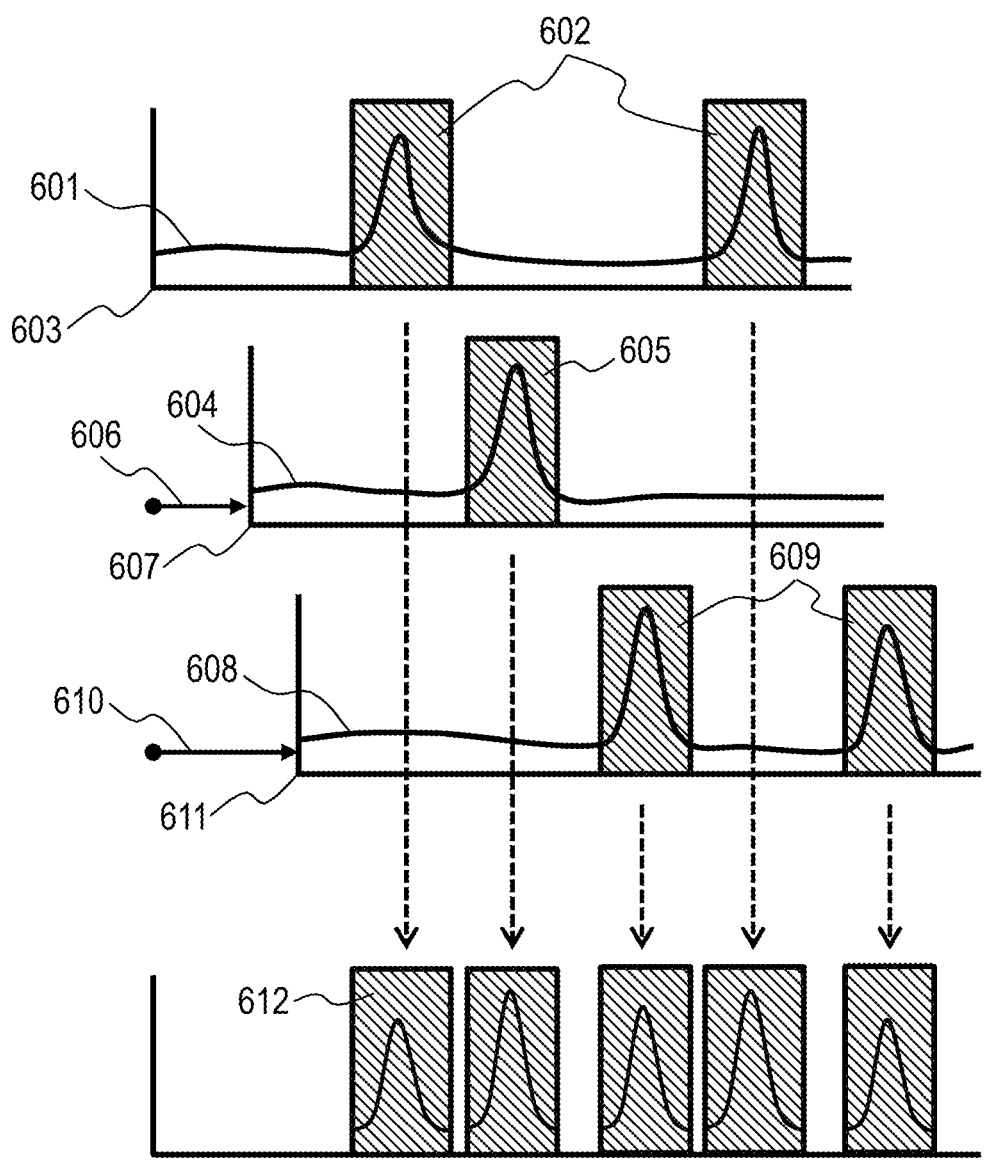
FIG. 6 is a view illustrating a process of assigning a data collection time to a free time of a mass spectrometer according to Embodiment 1.

FIG. 6 is a conceptual diagram illustrating assignment of a data collection time to the free time of the mass spectrometer. An analysis start time 603 of a first sample 1 is defined as an analysis start time of the device of the present embodiment. The data collection time which is the b.time during collection when the analysis time of the first sample 1 is divided is illustrated as a data collection time 602 of the drawing. An analysis start time 607 of a second sample 2 is defined as a time obtained by searching for and adding a start time offset 606 of the second sample 2 of a time which does not overlap the data collection time 602 of the first sample 1. This offset does not overlap the other data collection of the data collection 605 and a gap may be added by a time required to set the mass spectrometer condition of the second sample 2. An analysis start time 611 of a third sample 3 is defined as a time obtained by searching for and adding a start time offset 610 of the third sample 3 of a time when the data collection time 609 of the sample 3 does not overlap any of the data collection time 602 of the first sample 1 and the data collection time 605 of the second sample 2.

The steps described above in FIG. 1 are performed by the number of times corresponding to sample repetition 105 and an analysis schedule is completed. When the schedules of all samples are determined, the following procedure starts. Waiting for the sample analysis start time 106 is a step of waiting for the start time of each sample of the analysis schedule determined until the previous step to proceed analysis in order of samples set in the sample table 305. When the sample analysis start time comes, a next step is performed.

In step 107 of setting the data collection signal pattern of a sample n in the delay signal generator, the signal pattern of the data collection time for the sample to be analyzed is set in the delay signal generator 217. FIG. 5 illustrates an example of the set pattern. A time 501 from input of the autosampler start signal to output of the delay signal and a signal width 502 which is the data collection time of the mass spectrometer are set in seconds. Thus, when the analysis operation of the liquid chromatogram device starts and the autosampler start signal 216 is input, the analysis start signal 219 corresponding to the necessary data collection time is output to the mass spectrometer 222 after a regular time set in the step 107 elapses.

Subsequently, in step 108, mass spectrometer data collection preparation and liquid chromatogram analysis operation start are performed. That is, the analysis condition is set in the mass spectrometer 222 and analysis operation start is instructed with respect to necessary streams of the liquid chromatogram systems 201 to 203. Although it is preferable for the mass spectrometer 222 to self-retain a plurality of analysis conditions and sequentially apply the set analysis conditions according to the signals from the delay signal generators 217, the control unit 221 may be configured to sequentially set the analysis conditions with respect to the mass spectrometer 222 according to the signal output timings of the delay signal generators 217. When the analysis operation of the liquid chromatogram proceeds by executing step 108 and component injection 403 is performed, the delay signal generators 217 start generation of the data collection signals and data collection is performed in the mass spectrometer 222 in the separation process 404.

In step 109 of determining whether the delay signal generators output all samples, whether overall liquid chromatogram analysis is completed and output of the delay signal generators 217 to the mass spectrometer 222 is completed is confirmed, and analysis is completed 110. When there is a sample not completed, the procedure returns to step 106 of waiting for the sample analysis start time and analysis of a next sample is instructed.

By the analysis schedule determination process of predetermining the analysis schedule of the chromatographic mass analysis device of the present embodiment, in the liquid chromatographic mass spectrometer including a plurality of streams, the analysis schedule can be appropriately predetermined such that the streams of the liquid chromatograms can operate well and the mass spectrometer can collect data at necessary timing.

According to the above-described chromatographic mass analysis device of Embodiment 1, with respect to the divided time, by a simple procedure of operating the a. pre-collection time and the c. post-collection time in parallel and then assigning the b. time during collection, the analysis schedule of the liquid chromatographic mass analysis device can be appropriately predetermined.

Embodiment 2

In Embodiment 1, for the elution time of the component to be detected, the operation time of the mass spectrometer was prescribed and scheduled as a known and fixed time. However, the component elution time may be changed by adjustment of the parameter illustrating the analysis conditions such as solvent composition, an amount of fed liquid and a column temperature. Embodiment 2 relates to a chromatographic mass analysis device capable of performing schedule adjustment by changing the analysis condition and extending the component elution time in addition to the configuration of Embodiment 1. That is, this embodiment relates to a chromatographic mass analysis device in which the control unit 221 adjusts the analysis conditions of liquid chromatogram systems 201 to 203, which are the chromatogram units, extends the component elution time, and assigns the collection time, and a control method thereof.

For this reason, the control unit 221 retains the parameter set for changing the component elution time in the storage unit and adjusts the analysis parameter such that data collection timing is appropriate for creation of a schedule using this parameter set. The parameter set for changing the component elution time is information retaining a relationship of how the component elution time in the liquid chromatogram is changed when some of the analysis conditions are changed. When the time during collection of a certain stream overlaps the time during collection of other streams, the analysis condition to be changed is inversely calculated from the parameter set to avoid overlapping, and the analysis schedule is re-created. Therefore, it is possible to increase an operation rate of the mass spectrometer and to further improve throughput.

Figures 7, 8:
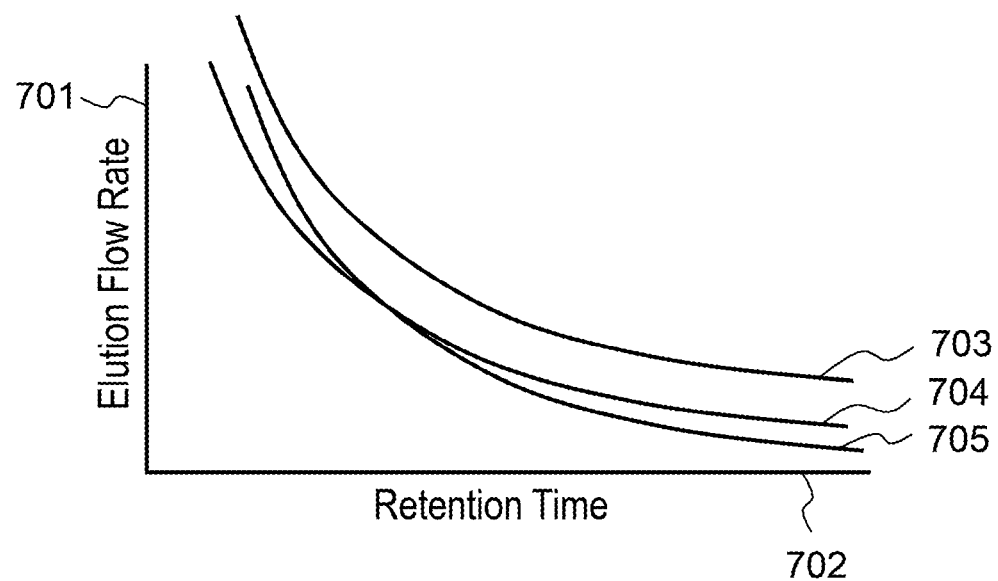
FIG. 7 is a graph illustrating a relationship between an eluent flow rate and a retention time when separating components in columns according to Embodiment 2.
FIG. 8 is a table illustrating a relationship between an eluent flow rate and a retention time when separating components in columns according to Embodiment 2.

FIG. 7 is a graph illustrating a relationship between an eluent flow rate and a retention time, which is an example of a parameter illustrating an adjustable analysis condition. That is, FIG. 7 is a graph in which a vertical axis and a horizontal axis are respectively an eluent flow rate 701 and a retention time 702 when the components are separated in the column of the liquid chromatogram system. In this figure, the graphs of the columns A, B and C are denoted by 703, 704 and 705. In general, when the eluent flow rate 701 increases, the retention time 702 is shortened. Conversely, when the eluent flow rate 701 decreases, the retention time 702 increases. That is, to increase the retention time 702, the eluent flow rate 701 may be decreased in the available range of the flow rate of the column.

FIG. 8 is a view illustrating an example of this relationship, and when the retention time in typically used pressure is 1.0, the change ratio of the retention time to the flow rate therebefore and thereafter is retained. In the table of FIG. 8, a column type 801, a flow rate 802 and a ratio 803 of a retention time against the standard flow rate are retained. Such a relationship table may be created and retained with respect to the parameters of the analysis conditions such as solvent composition, an amount of fed liquid and a column temperature. Since the conditions may be changed according to the retained relationship table, it is possible to change the component elution time.

Considering that the component elution time is adjustable, it is possible to set an appropriate component elution time to assign the schedule of the mass spectrometer when determining the schedule. In the configuration of the chromatographic mass analysis device of the present embodiment, the schedule is based on the above knowledge.

Figure 9:
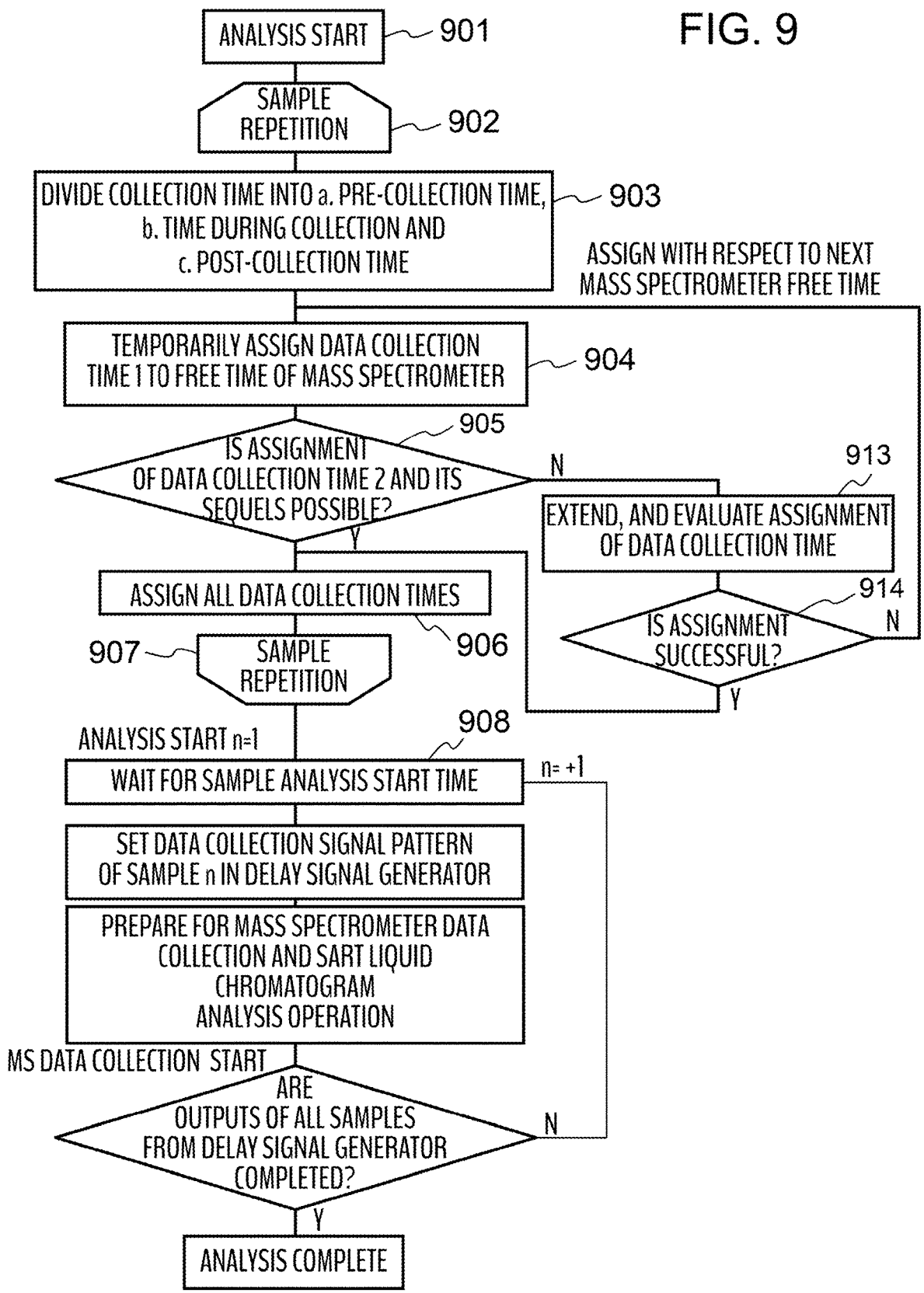
FIG. 9 is a view illustrating an example of an analysis schedule determination procedure for adjusting a component elution time to assign times of a mass spectrometer according to Embodiment 2.

FIG. 9 illustrates a procedure for performing time assignment of the mass spectrometer while adjusting a component elution time according to Embodiment 2. The steps after analysis start 901 will be described. Sample repetition step 902 is a repeating step of sequentially processing the sample indicated by the sample table illustrated in FIG. 3.

In FIG. 9, step 903 of dividing the collection time into an a. pre-collection time, a b. time during collection, and a c. post-collection time is a process of dividing the analysis time of each sample into the above times, similarly to step 103 described in Embodiment 1.

Figure 10:
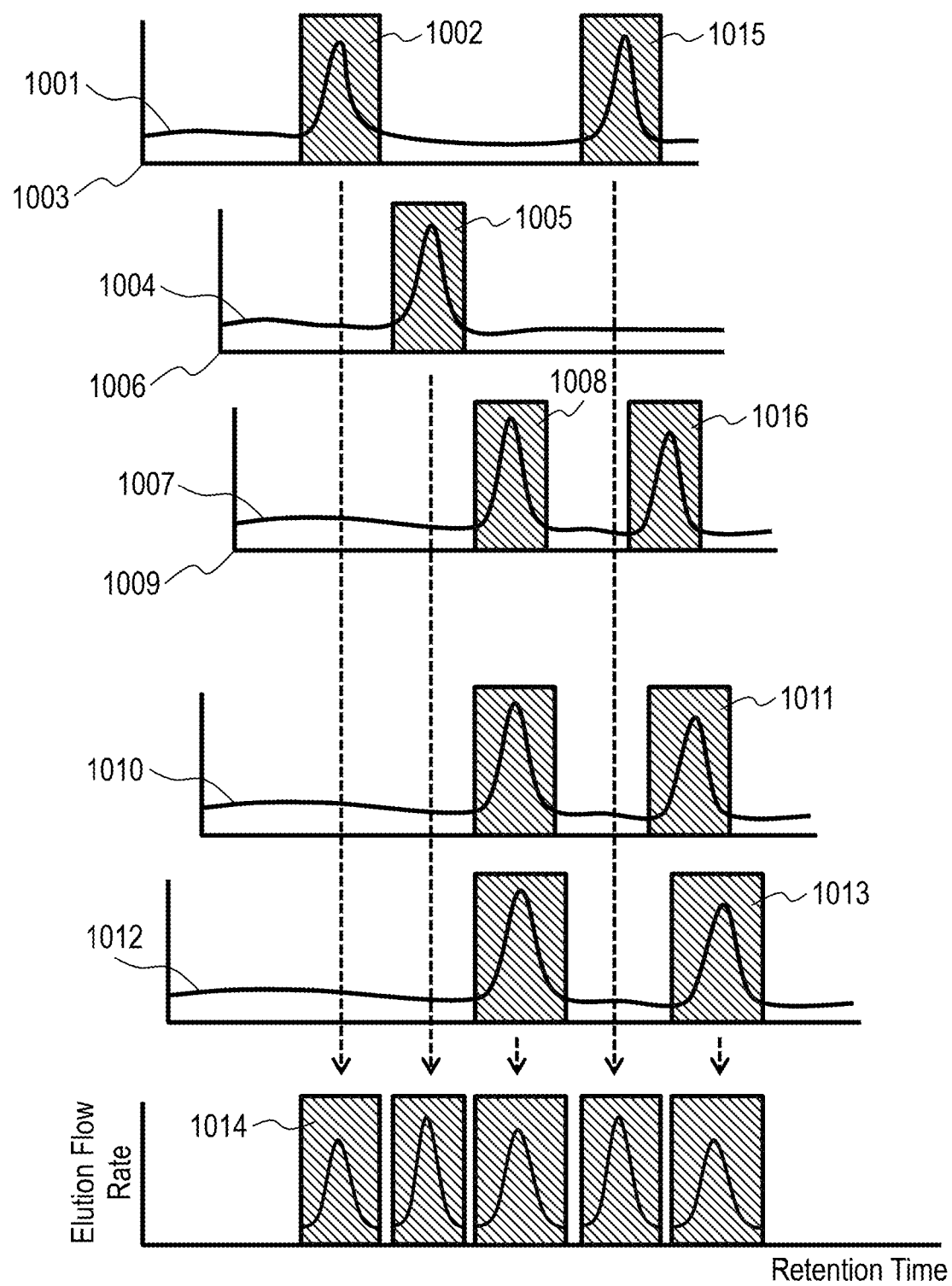
FIG. 10 is a view illustrating a process of extending a data collection time to assign times of a mass spectrometer while adjusting a component elution time according to Embodiment 2.

Similarly to step 104 of Embodiment 1, in step 904 of temporarily assigning the data collection time 1, which is the time during collection, to the free time of the mass spectrometer, analysis of the sample is temporarily assigned to a time when liquid chromatogram analysis is capable of starting and the data collection time 1 of the mass spectrometer is capable of being scheduled. Details thereof are illustrated in FIG. 10. The analysis start time 1003 of a first sample 1 of FIG. 10 is defined as the analysis start time of the device of the present embodiment.

The analysis start time 1006 of a second sample 2 is temporarily assigned to an earliest time when the data collection of the second sample 2 is performed. Here, temporary assignment is performed such that data collection 1005 of the second sample 2 is disposed immediately after data collection 1002 of the first sample 1.

In step 905 of FIG. 9, whether assignment of the data collection time 2 and its sequels is possible is determined. Since the second sample 2 does not have the data collection time 2 and its sequels, second sample 2 is ignored and, in step 906 of assigning all data collection times, data collection time assignment is decided.

With respect to a third sample 3, in step 904 of temporarily assigning the data collection time 1 to the free time of the mass spectrometer, the data collection time 1 is temporarily assigned to the position of the data collection time 1008 of FIG. 10. However, in determination as to whether assignment of the data collection time 2 and its sequels is possible in step 905, whether the data collection time 1015 of the first sample 1 overlaps the data collection time 1016 of the third sample 3 is determined. Therefore, in the configuration of the present embodiment, step 913 of extending and evaluating assignment of the data collection time is performed.

Step 913 of extending and evaluating assignment of the data collection time is a step of calculating an assumed retention time when the parameter of the variable range illustrated in the table of FIG. 8 is applied to the analysis condition and testing the schedule based on the result. For example, in the third sample 3, at a flow rate of 0.7 mL/min and a flow rate of 0.6 mL/min, by the relationship illustrated in FIGS. 7 and 8, the elution time becomes longer. Specifically, the a. pre-collection time, the b. time during collection and the c. post-collection time divided from the collection time may be multiplied by the ratio of the retention time against the standard flow rate of FIG. 8.

In FIG. 10, data collection 1011 in the chromatogram signal 1010 at a flow rate of 0.7 mL of the third sample 3 overlaps but the data collection time of any of the first sample 1 and the second sample 2 does not overlap the chromatogram signal 1013 at a flow rate of 0.6 mL of the third sample 3. Therefore, by analysis of the sample 3 at the flow rate of 0.6 mL/min, it is possible to efficiently start analysis of the third sample 3.

Step 913 of extending and evaluating assignment of the data collection time of FIG. 9 is a step of evaluating that the data collection time when the condition is changed as described above does not overlap the data collection time of other samples. For change and evaluation of such conditions, as an easy method, the table illustrated in FIG. 8 may be prepared and retained with respect to changeable condition and the control unit 221 of FIG. 1 may repeat evaluation in an entire changeable range in a round-robin manner. As a more advanced method, a conversion approximate equation is defined and retained with respect to each changeable condition and the control unit 221 may derive an optimal value by multivariable analysis.

In step 914 of determining whether assignment of FIG. 9 succeeds, whether an assignable condition is found is determined. When assignment is impossible, the procedure proceeds to a step of temporarily assigning the data collection time 1 to the free time with respect to the next free time of the mass spectrometer, to which the data collection time 1 may be assigned.

Similarly to Embodiment 1, the above steps are repeated with respect to all samples by step 907 of sample repetition.

After repetition of all samples is completed and the schedule is determined, analysis operation of step 908 and its sequels of waiting for the sample analysis start time are performed. This operation is equal to that described in FIG. 1 and thus will be omitted.

According to the chromatographic mass analysis device and the control method of Embodiment 2, by performing adjustment while considering the data collection timing between the plurality of streams, it is possible to increase the operation rate of the mass spectrometer and to improve throughput.

It should be noted that the present invention is not limited to the above embodiments and includes various modifications. For example, the above-described embodiments have been described in detail for a better understanding of the present invention and are not necessarily to be construed as limiting the scope of the present invention. It is possible to replace the constitution of an embodiment with that of another embodiment and to add the constitution of another embodiment to the constitution of an embodiment. It is possible to add, delete, and replace other configurations with respect to some of the configurations of each embodiment. For example, in the configuration of the chromatographic mass analysis device of each of the embodiments, although the case where a single mass spectrometer is used as the mass spectrometer is described, the mass spectrometer may be composed of two or more mass spectrometers and the data collection time may be more freely assigned according to the number of mass spectrometers. In the configuration of the chromatographic mass analysis device of Embodiment 2, although the case of extending the data collection time corresponding to one chromatogram unit is described, the data collection time corresponding to the two chromatogram units may be extended.

Although an example of creating a program for realizing some or all of the above-described configurations, functions and control units is described, some or all of them may be realized in hardware installed in an integrated circuit. That is, all or some functions of the control unit may be realized by an integrated circuit such as an application specific integrated circuit (ASIC), a field programmable gate array (FPGA), and the like instead of the program.

REFERENCE SIGNS LIST 201, 202, 203: liquid chromatogram systems 1, 2, 3
204, 205, 206: sample groups A, B, C
207, 208, 209: pumps 1, 2, 3
210, 211, 212: autosamplers 1, 2, 3
213, 214, 215: columns 1, 2, 3
216: autosampler start signal
217: delay signal generator
218: logic OR circuit
219: analysis start signal
220: valve
221: control unit
222: mass spectrometer
301: sample name
302: vial No.
303: stream
304: analysis condition
305: sample table
410: pre-collection time 1
411: data collection time 1 that is time during collection
412: pre-collection time 2
413: data collection time 2 that is time during collection
414: post-collection time
501: time
502: signal width
601, 604, 608: chromatogram signals of samples 1, 2, 3
602, 605, 609: data collection
603, 607, 611: analysis start times of samples 1, 2, 3
606, 610: start time offsets of samples 2, 3
612: mass spectrometer output
701: eluent flow rate
702: retention time
703, 704, 705: graphs of columns A, B, C
801: column type
802: flow rate
803: ratio of retention time against standard flow rate
1001, 1004, 1007: chromatogram signals of samples 1, 2, 3
1002, 1005, 1008, 1011, 1013, 1015, 1016: data collection times
1003, 1006, 1009: analysis start times of samples 1, 2, 3
1010: chromatogram signal at the flow rate of 0.7 mL of third sample 3
1012: chromatogram signal at the flow rate of 0.6 mL of third sample 3
1014: mass spectrometer output
1101: operation screen
1102: order table
1103: data storage destination folder designation
1104: load and save button
1105: device status
1106: manual operation unit
1107: start/stop button
1108: schedule button

The invention claimed is:
1. A chromatographic mass analysis device comprising:
a plurality of chromatogram units;
a switching unit configured for selecting one of samples eluted from the plurality of chromatogram units;
a mass analysis unit configured for ionizing and analyzing the sample introduced from the switching unit; and a control unit configured for controlling the chromatogram units, the switching unit and the mass analysis unit, wherein the control unit includes a display unit configured for displaying an operation screen and the display unit includes a button configured for instructing creation of a schedule configured for predetermining an analysis start time of each of the plurality of chromatogram units, and wherein the control unit divides time required for sample analysis into a pre-collection time, a time during collection and a post-collection time, assigns the time during collection by searching for a time position where the times during collection of the plurality of chromatogram units do not overlap, and predetermines an analysis start time of each of the plurality of chromatogram units, and wherein the control unit stores parameter sets for varying component elution times, adjusts analysis parameters, and changes component elution times.

2. The chromatographic mass analysis device according to claim 1, further comprising:

a delay signal generator configured for generating a start signal of the mass analysis unit based on sample injection signals output from the plurality of chromatogram units according to the time during collection determined by the control unit.

3. The chromatographic mass analysis device according to claim 1, wherein the control unit generates a start signal of the mass analysis unit based on sample injection signals output from the plurality of chromatogram units according to the determined time during collection.

4. The chromatographic mass analysis device according to claim 1, wherein the control unit adjusts an analysis condition of each of the chromatogram units to extend a component elution time, assigns the time during collection, and determines an analysis start time of each of the plurality of chromatogram units.

5. The chromatographic mass analysis device according to claim 4, wherein the analysis condition adjusted by the control unit is a solvent composition of each of the plurality of chromatogram units.

6. The chromatographic mass analysis device according to claim 4, wherein the analysis condition adjusted by the control unit is a solvent flow rate of each of the plurality of chromatogram units.

7. The chromatographic mass analysis device according to claim 4, wherein the analysis condition adjusted by the control unit is a column temperature of each of the plurality of chromatogram units.

8. A control method of a chromatographic mass analysis device, comprising:

providing the chromatographic mass analysis device, wherein the chromatographic mass analysis device includes a plurality of chromatogram units, a switching unit for selecting one of samples eluted from the plurality of chromatogram units, a mass analysis unit for ionizing and analyzing the sample introduced from the switching unit, and a control unit for controlling the chromatogram units, the switching unit and the mass analysis unit, wherein the control unit includes a display unit for displaying an operation screen, and the display unit includes a button configured for instructing creation of a schedule configured for predetermining an analysis start time of each of the plurality of chromatogram units, and dividing a time required for sample analysis into a pre-collection time, a time during collection and a post-collection time using the control unit, assigning the time during collection at a time position where the times during collection of the plurality of chromatogram units do not overlap using the control unit, and predetermining an analysis start time of each of the plurality of chromatogram units using the control unit, and storing parameter sets for varying component elution times, adjusting analysis parameters, and changing component elution times using the control unit, and displaying on the display unit an operation status of the plurality of chromatogram units and a progress status of analysis.

9. The control method according to claim 8, further comprising:

generating a start signal of the mass analysis unit by the control unit based on sample injection signals output from the chromatogram units according to the determined time during collection.

10. The control method according to claim 8, further comprising:

using the control unit to adjust an analysis condition of each of the chromatogram units to extend a component elution time, to assign the time during collection, and to determine an analysis start time of each of the plurality of chromatogram units.

11. The control method according to claim 10, further comprising:

adjusting the analysis condition by the control unit, wherein the analysis condition is a solvent composition of each of the chromatogram units.

12. The control method according to claim 10, further comprising:

adjusting the analysis condition by the control unit, wherein the analysis condition is a solvent flow rate of each of the chromatogram units.

13. The control method according to claim 10, further comprising:

adjusting the analysis condition by the control unit, wherein the analysis condition is a column temperature of each of the chromatogram units.

* * * * *